(12) United States Patent
Chen

(10) Patent No.: US 9,302,532 B2
(45) Date of Patent: Apr. 5, 2016

(54) SPOKED WHEEL FOR A BICYCLE

(71) Applicant: Shu-Yi Chen, Taichung (TW)

(72) Inventor: Shu-Yi Chen, Taichung (TW)

(73) Assignee: MEGA COMPOSITE TECHNOLOGY CO., LTD., Taichung (TW)

( * ) Notice: Subject to any disclaimer, the term of this patent is extended or adjusted under 35 U.S.C. 154(b) by 164 days.

(21) Appl. No.: 14/271,406

(22) Filed: May 6, 2014

(65) Prior Publication Data

US 2015/0321507 A1 Nov. 12, 2015

(51) Int. Cl.
*B60B 1/04* (2006.01)
*B60B 1/00* (2006.01)

(52) U.S. Cl.
CPC ............... *B60B 1/047* (2013.01); *B60B 1/003* (2013.01); *B60B 1/041* (2013.01)

(58) Field of Classification Search
CPC .. B60B 21/062; B60B 21/064; B60B 21/068; B60B 1/00; B60B 1/003; B60B 1/041; B60B 1/043; B60B 1/044
USPC .............................................. 301/58, 55, 104
See application file for complete search history.

(56) References Cited

U.S. PATENT DOCUMENTS

| | | | | |
|---|---|---|---|---|
| 7,305,877 B2* | 12/2007 | Beyrich | ................ | G01F 1/6842 73/202.5 |
| 8,777,328 B2* | 7/2014 | Meggiolan | ............ | B60B 21/025 301/55 |
| 2005/0023883 A1* | 2/2005 | Okajima | ................ | B60B 1/041 301/58 |
| 2007/0200422 A1* | 8/2007 | Davis | ...................... | B60B 1/003 301/95.106 |
| 2013/0320748 A1* | 12/2013 | Schlanger | ................ | B60B 7/01 301/37.24 |

* cited by examiner

*Primary Examiner* — Sarah McPartlin (57) ABSTRACT

A spoked wheel includes a rim, at least one spoke and at least one sealing sticker. The rim includes a spoke bed wall with at least one spoke hole therein, a pair of tire-holding flanges extending from opposite edges of the spoke bed wall, a base wall located radially inboard from the spoke bed wall and connected to the flanges. The base wall has an opening corresponding to the spoke hole of the spoke bed wall. The spoke has a nipple portion inserted in the spoke hole of the spoke bed wall of the rim, and a shank portion extending from the nipple portion and through the opening of the base wall of the rim. The sealing sticker is provided to seal the opening of the base wall of the rim and close any gap between the opening of the base wall and the shank portion of the spoke.

7 Claims, 8 Drawing Sheets

SPOKED WHEEL FOR A BICYCLE

BACKGROUND OF THE INVENTION

1. Field of the Invention

The present invention relates to a spoked wheel, and more particularly to a spoked wheel having a rim with its spoke openings sealed to reduce aerodynamic drag.

2. Description of the Related Art

Generally, a spoked wheel for a bicycle comprises a peripheral rim, a central hub and a plurality of spokes extending between the hub and the rim. Various wheel configurations have been attempted to achieve desirable wheel attributes of reduced weight or increased lateral stiffness over a traditional spoked bicycle wheel. However, these proposed improvements typically result in certain drawbacks.

Figure 8:
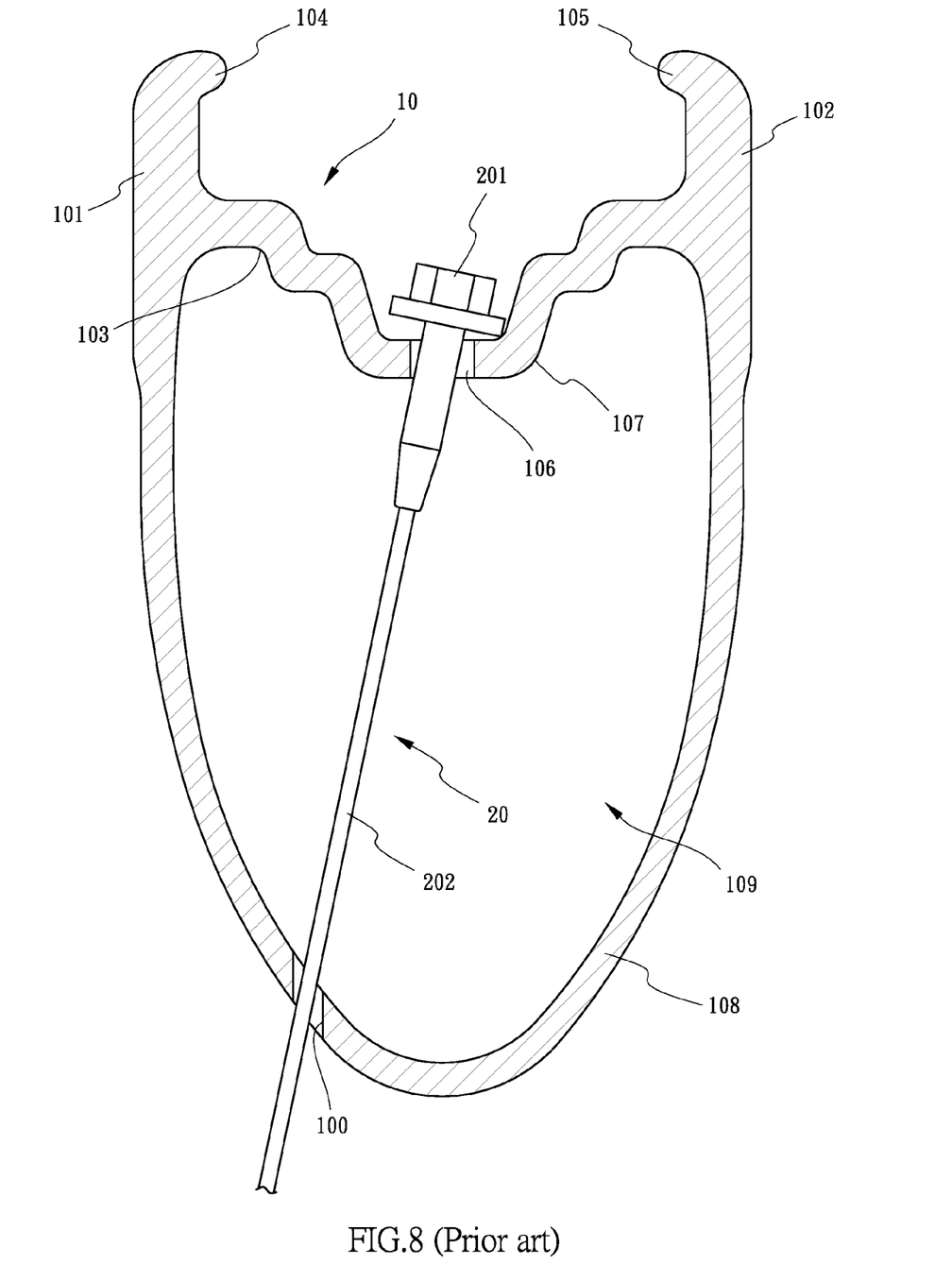
FIG. 8 is a prior art.

For example, a traditional spoked bicycle wheel is illustrated in FIG. 8, and has a rim 10, a hub (not shown), and a plurality of spokes (20, but only one is shown) extending therebetween. The rim 10 includes a spoke bed wall 107 with at least one spoke hole 106 therein for passage of a nipple portion 201 of the spoke 20, and a pair of flanges 101, 102 for capturing the beads of a tire (not shown). The rim 10 further includes a base wall 108 located radially inboard from the spoke bed wall 107 and connected to the flanges 101, 102. As such, an internal cavity 109 is formed between the spoke bed wall 107 and the base wall 108. The base wall 108 has at least one opening 100 corresponding to the spoke hole 106 of the spoke bed wall 107 for passage of a shank portion 202 of the spoke 20. However, as best seen in FIG. 8, a gap is generated between the opening 100 of the base wall 108 and the shank portion 202 of the spoke 20, which may induces air resistance to the rim during the bicycle's running.

SUMMARY OF THE INVENTION

Accordingly, it is an object of the present invention to provide a spoked wheel that provides reduced aerodynamic drag. The spoked wheel includes a rim, at least one spoke and at least one sealing sticker.

The rim includes a spoke bed wall with at least one spoke hole therein, a pair of tire-holding flanges extending from opposite edges of the spoke bed wall, a base wall located radially inboard from the spoke bed wall and connected to the flanges, and an internal cavity between the spoke bed wall and the base wall. The base wall has at least one opening corresponding to the spoke hole of the spoke bed wall.

The spoke has a nipple portion inserted in the spoke hole of the spoke bed wall of the rim, and a shank portion extending from the nipple portion and through the opening of the base wall of the rim. The sealing sticker is attached to the base wall of the rim about the spoke to seal the opening of the base wall of the rim and close any gap between the opening of the base wall and the shank portion of the spoke. By doing so, air may be prevented from entering the rim while the bicycle's running and a reduced aerodynamic drag can be provided.

Preferred embodiments of the invention may have the following additional characteristics, either alone or in combination:

The sealing sticker has an adhesive layer by means of which the sealing sticker is bonded to the base wall of the rim, and defines therein a central bore through which the spoke passes. Furthermore, the sealing sticker may be radially formed with a slit in communication with the central bore of the sealing sticker.

Further benefits and advantages of the present invention will become apparent after a careful reading of the detailed description with appropriate reference to the accompanying drawings.

DETAILED DESCRIPTION OF EMBODIMENTS

With reference now to the drawings, and in particular to FIGS. 1 through 5 thereof, a spoked wheel is illustrated which includes a rim 1, at least one spoke 2 and at least one sealing sticker 3.

Figure 1:
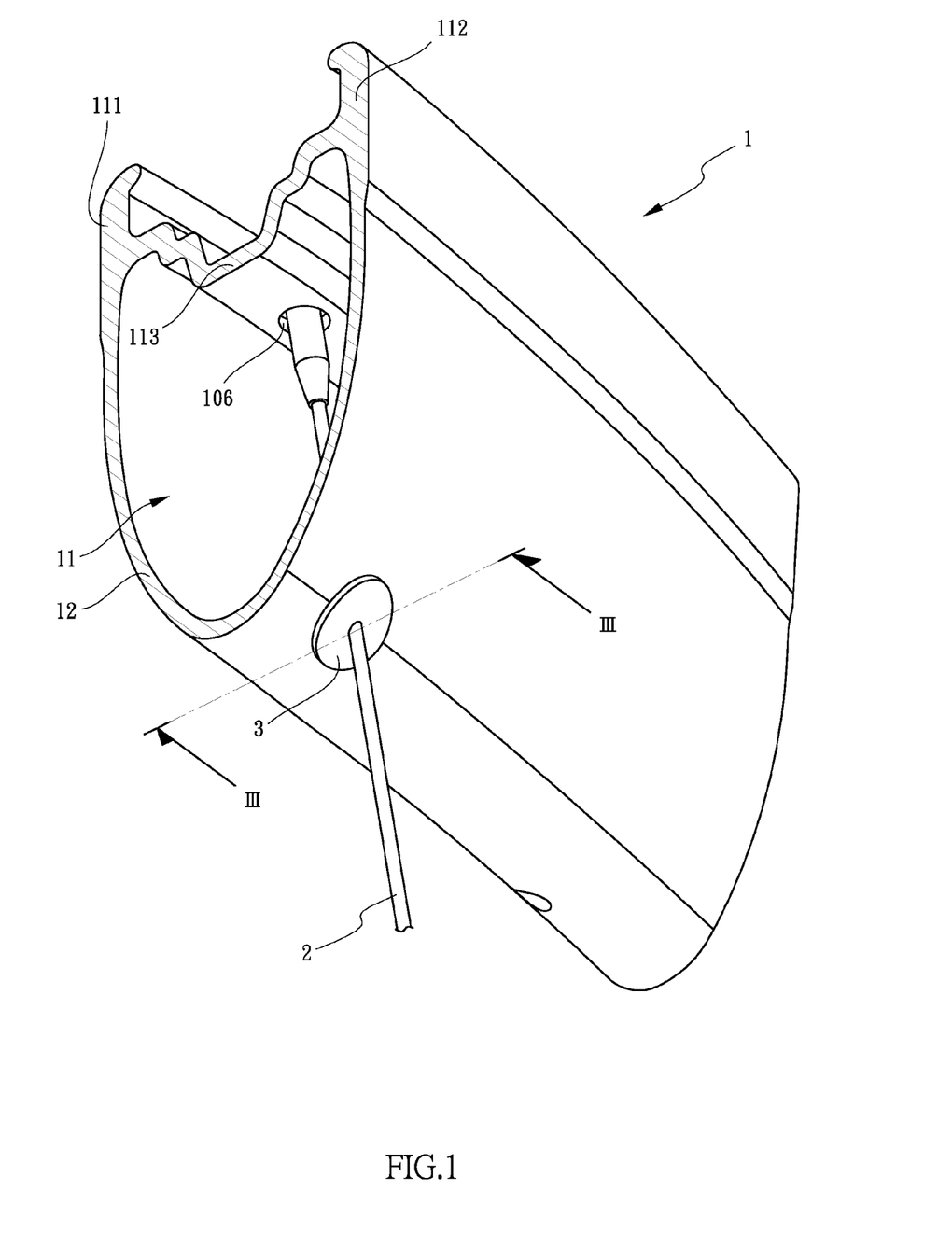
FIG. 1 is a partial perspective view of a spoked wheel in accordance with one embodiment of the present invention.
Figure 2:
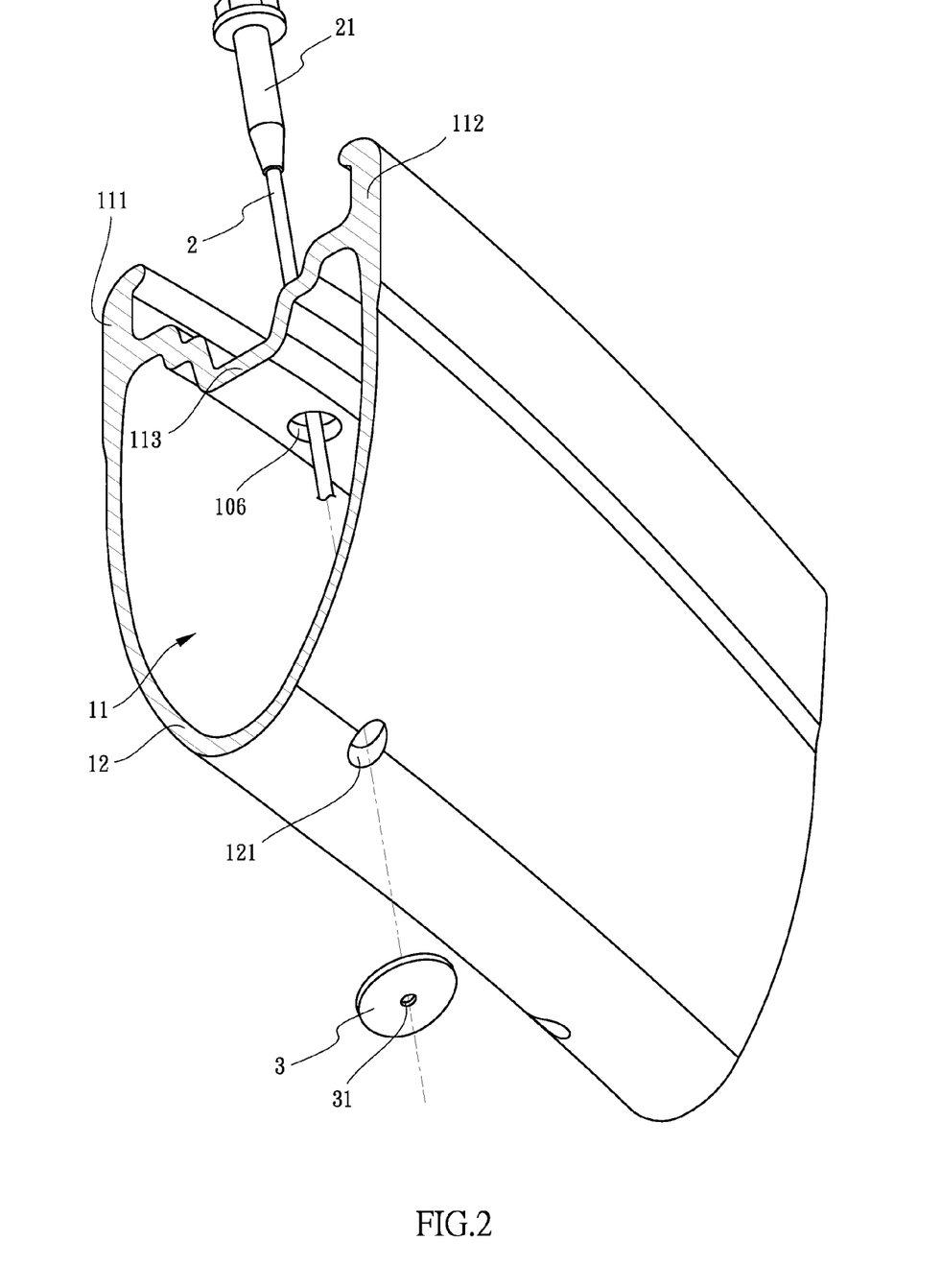
FIG. 2 is an exploded perspective view of the spoked wheel shown in FIG. 1.

As shown in FIGS. 1 and 2, the rim 1 includes a spoke bed wall 113, a pair of tire-holding flanges 111, 112 extending from opposite edges of the spoke bed wall 113, and a base wall 12 located radially inboard from the spoke bed wall 113 and connected to the flanges 111, 112. As such, a internal cavity 11 is defined between the spoke bed wall 113 and the base wall 12.

Figure 3:
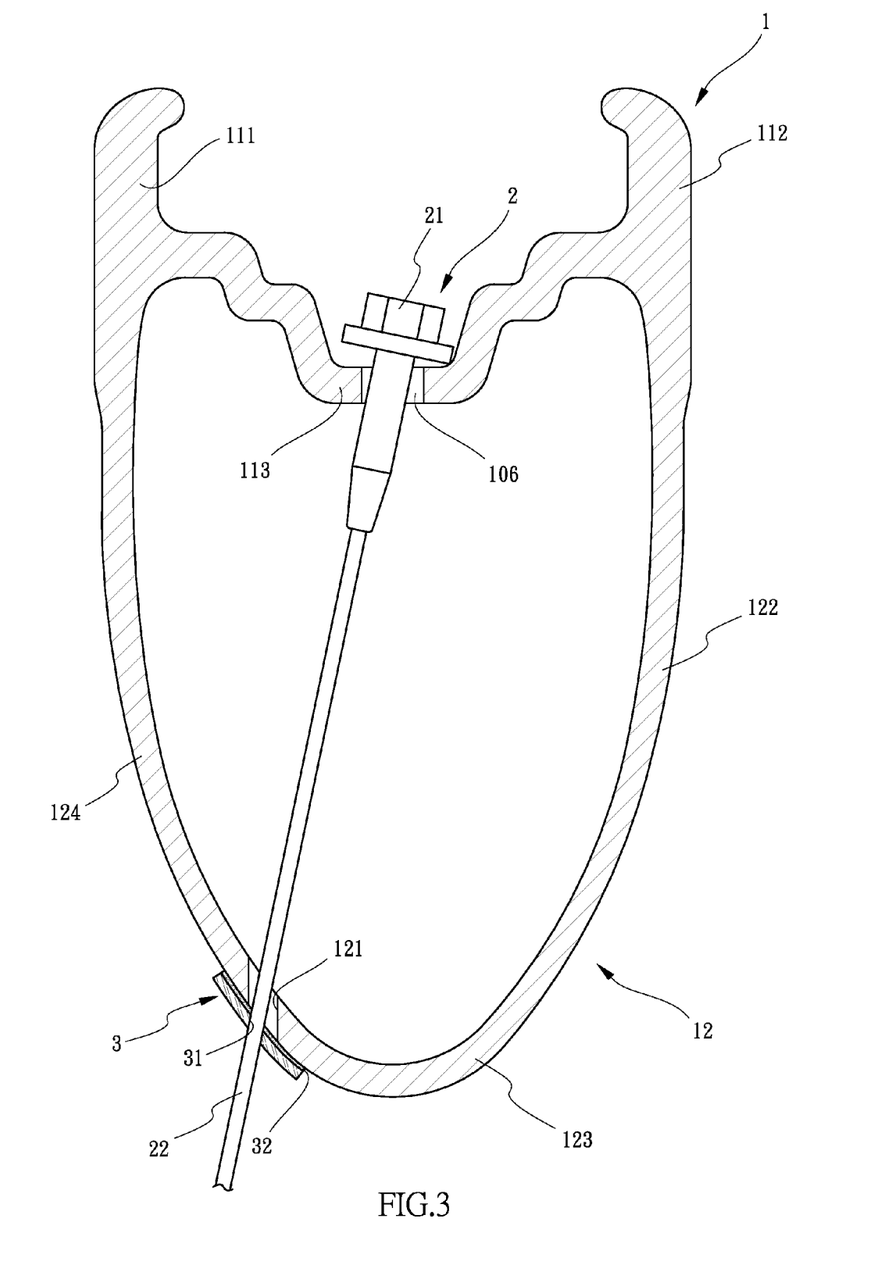
FIG. 3 is a cross-sectional view of the spoked wheel taken along the line III-III in FIG. 1, showing that one spoke passes through a lateral portion of the base wall of the rim.

For spoke attachment, the spoke bed wall 113 of the rim 1 defines therein at least one spoke hole 106 for reception of a nipple portion 21 (see FIG. 2) of the spoke 2, and the base wall 12 defines at least one opening 121 corresponding to the spoke hole 106 of the spoke bed wall 113 to receive a shank portion 22 of the spoke 2, as shown in FIG. 3. That is, the nipple portion 21 of the spoke 2 is positioned in the spoke hole 106 in the spoke bed wall 113 of the rim 1 while the shank portion 22 of the spoke 2 passes through the opening 121 in the base wall 12 of the rim 1.

Figure 4:
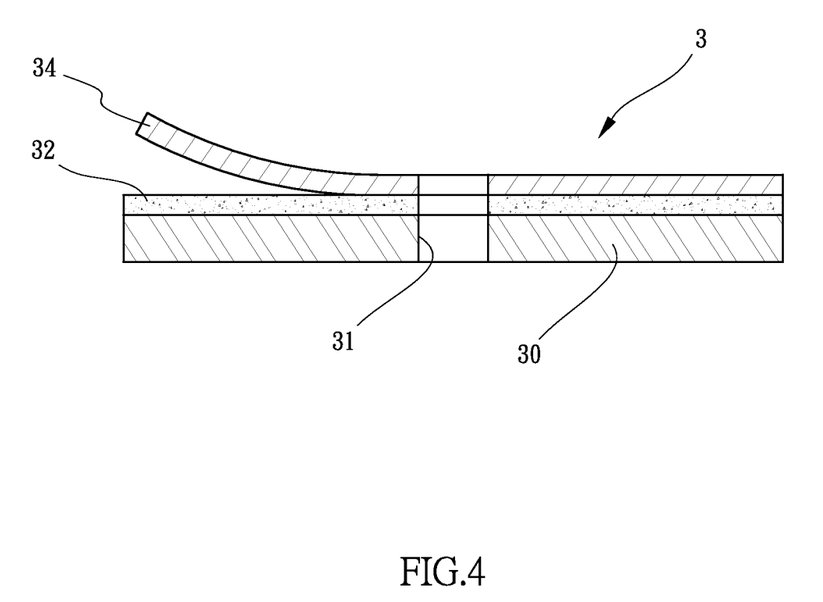
FIG. 4 is a cross-section of a sealing sticker used in the spoked wheel of FIG. 1.

In order to reduce air resistance, as shown in FIG. 4, the sealing sticker 3 is provided which includes a sealing layer 30, an adhesive layer 32 coated on one side of the sealing layer 30 and a release paper 34 applied on the exposed side of adhesive layer 32. The sealing layer 30 is made of a flexible and elastic material, such as silicone, and is provided to be attached to an outer surface of the base wall 12 of the rim 1 by means of the adhesive layer 32, as best seen in FIG. 3. The release paper 34 is provided to protect the adhesive layer 32 from dust and other airborne materials before the sealing sticker 3 is used. Moreover, the sealing sticker 3 defines therein a central bore 31 through which the spoke 2 passes, and before receiving the spoke 2, the central bore 31 of the sealing sticker 3 has a diameter slightly smaller than or equal to the that of the spoke 2.

In use, as shown in FIG. 3, the sealing sticker 3 is attached to the outer surface of the base wall 12 of the rim 1 about the spoke 2 to seal the opening 121 of the base wall 12 of the rim 1 and close any gap between the opening 121 of the base wall 12 and the shank portion 22 of the spoke 2. This prevents air from entering the cavity 11 of the rim 1 while the bicycle's running and therefore provides reduced aerodynamic drag.

It is noted that in order to attach the sealing sticker 3 onto the rim 1, the sealing sticker 3 will have to be placed around the shank portion 22 of the spoke 2 before the nipple portion 21 of the spoke 2 is joined to the shank portion 22 of the spoke 2 during manufacturing process. Once the nipple portion 21 of the spoke 2 is well engaged in the spoke hole 103 in the spoke bed wall 113, the sealing sticker 3 can then be moved along the spoke 2 to be attached onto the base well 12 of the rim 1.

Figure 7:
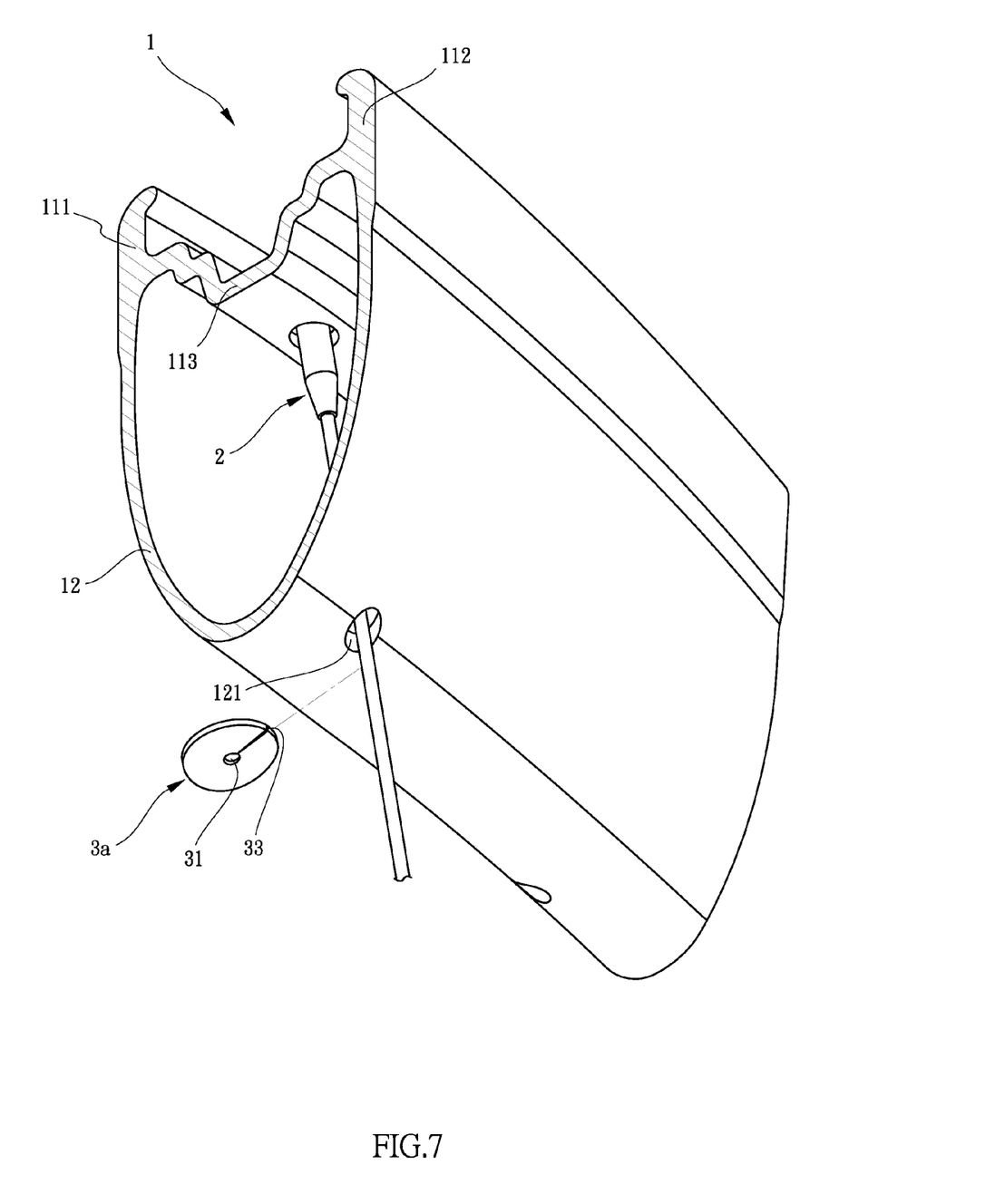
FIG. 7 is a cross-sectional view of a spoked wheel in accordance with yet another embodiment of the present invention.

Alternatively, in the modification shown in FIG. 7, the sealing sticker 3a is substantially the same as that previously described in FIGS. 1-3, except that the sealing sticker 3a further is radially formed with a slit 33 in communication with the central bore 31 of the sealing sticker 3a. In this case, the sealing sticker 3a doesn't have to be placed around the shank portion 22 of the spoke 2 in advance. Instead, the sealing sticker 3a may be attached to the base wall 12 of the rim 1 after the spoke 2 is completely mounted on the rim 1.

Figure 5:
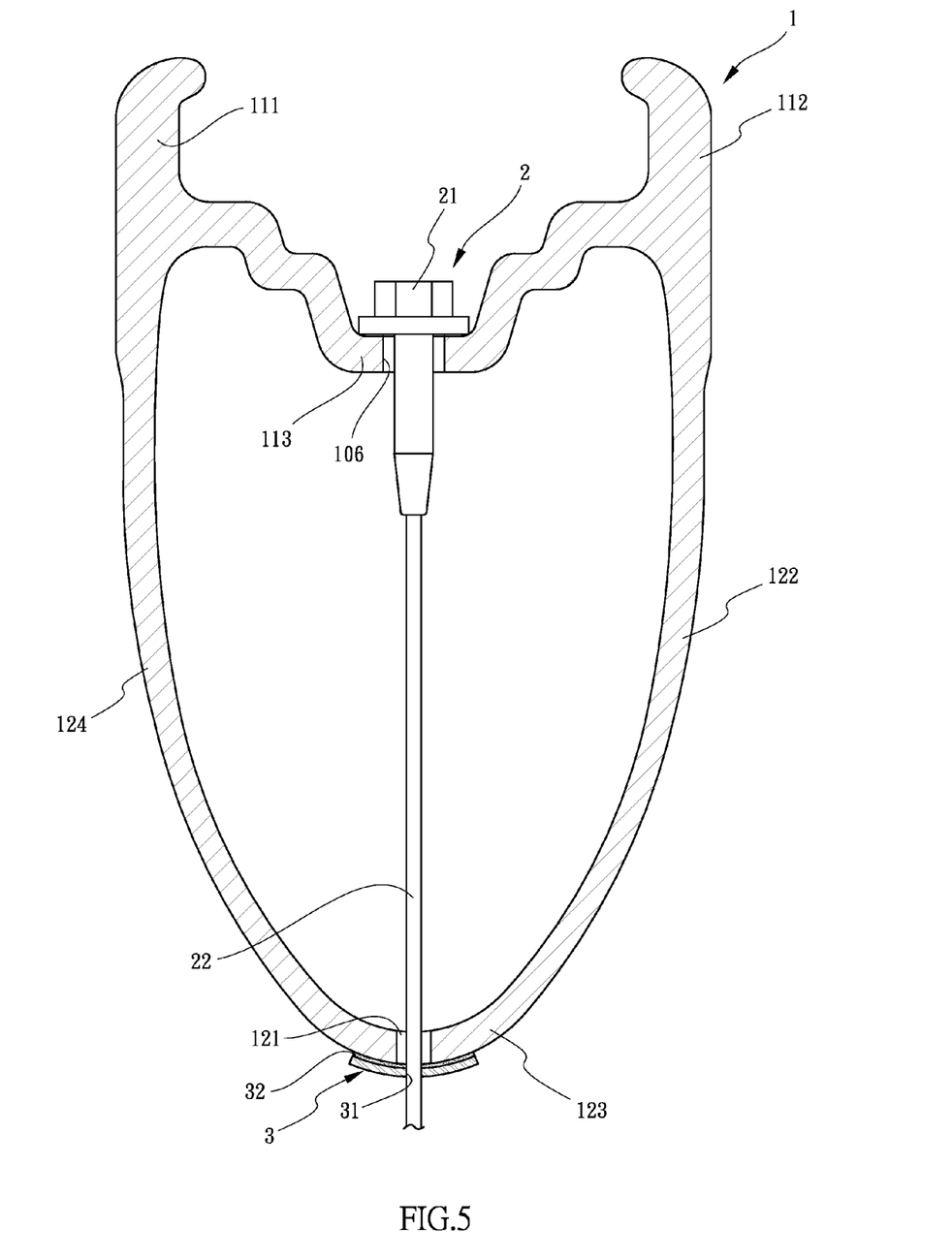
FIG. 5 is another cross-sectional view of the spoked wheel, showing that another spoke passes through a middle portion of the base wall of the rim.

Referring back to FIG. 3, the opening 121 of the base wall 12 is defined in one of lateral portions 122, 124 of the base wall 12. However, in other examples, the opening 121 of the base wall 12 is defined in a middle portion 123 of the base wall 12, as illustrated in FIG. 5. In both cases where the openings 121 in the base wall 12 are of different sizes or shapes, the sealing sticker 3 or 3a can be applied to seal each type of the openings 121 due to the flexibility and elasticity of the sealing sticker 3 or 3a.

Figure 6:
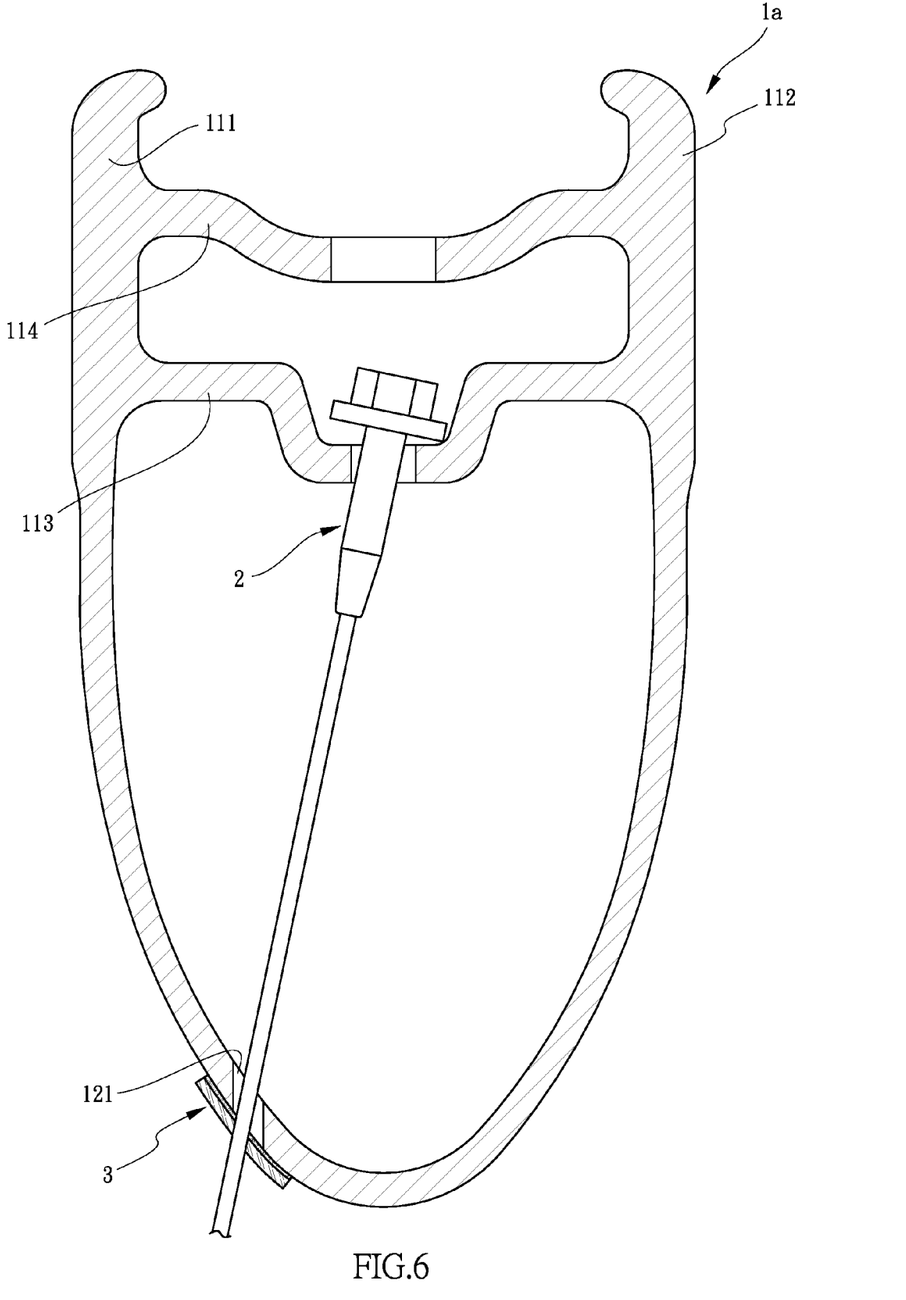
FIG. 6 is a cross-sectional view of a spoked wheel in accordance with another embodiment of the present invention.

Referring to FIG. 6, there is shown an alternate embodiment that is similar to the embodiment shown in FIG. 3, except that the rim 1a further includes a tire bed wall 114 extending between the tire-holding flanges 111, 112 and located radially outboard from the spoke bed wall 113. The tire bed wall together with the tire-holding flanges 111, 112 is provided to retain the beads of a tire.

It is to be understood that the disclosed embodiments are illustrative in nature and the invention is not to be limited to any one or more embodiments except as set forth in the following claims.

What is claimed is:

1. A spoked wheel, comprising:
    a rim including a spoke bed wall with at least one spoke hole therein, a pair of tire-holding flanges extending from opposite edges of the spoke bed wall, a base wall located radially inboard from the spoke bed wall and connected to the flanges, and an internal cavity between the spoke bed wall and the base wall; the base wall having at least one opening corresponding to the spoke hole of the spoke bed wall;
    at least one spoke having a nipple portion inserted in the spoke hole of the spoke bed wall of the rim, and a shank portion extending from the nipple portion and through the opening of the base wall of the rim; and
    at least one sealing sticker comprising a flexible and elastic material, the at least one sealing sticker attached to the base wall of the rim about the spoke to seal the opening of the base wall of the rim and close any gap between the opening of the base wall and the shank portion of the spoke.

2. The spoked wheel as recited in claim 1, wherein the sealing sticker has an adhesive layer by means of which the sealing sticker is bonded to the base wall of the rim, and defines therein a central bore through which the spoke passes.

3. The spoked wheel as recited in claim 2, wherein the sealing sticker further is radially formed with a slit in communication with the central bore of the sealing sticker.

4. The spoked wheel as recited in claim 1, wherein the opening of the base wall is defined in a lateral portion of the base wall.

5. The spoked wheel as recited in claim 1, wherein the material of the sealing sticker is silicon.

6. The spoked wheel as recited in claim 1, wherein the sealing sticker defines therein a central bore through which the spoke passes, and before receiving the spoke, the central bore of the sealing sticker has a diameter slightly smaller than or equal to the that of the spoke.

7. The spoked wheel as recited in claim 1, wherein the rim further includes a tire bed wall extending between the tire-holding flanges and located radially outboard from the spoke bed wall.

* * * * *